(12) United States Patent
Lin et al.

(10) Patent No.: US 7,529,391 B2
(45) Date of Patent: May 5, 2009

(54) SIGNATURE VERIFICATION

(75) Inventors: Zhouchen Lin, Beijing (CN); Liang Wan, Shatin (HK); Bin Wan, WuHan (CN)

(73) Assignee: Microsoft Corporation, Redmond, WA (US)

(*) Notice: Subject to any disclaimer, the term of this patent is extended or adjusted under 35 U.S.C. 154(b) by 729 days.

(21) Appl. No.: 11/321,232

(22) Filed: Dec. 29, 2005

(65) Prior Publication Data

US 2007/0154071 A1   Jul. 5, 2007

(51) Int. Cl.
*G06K 9/00* (2006.01)
*G06K 9/46* (2006.01)

(52) U.S. Cl. .................................. 382/119; 382/190

(58) Field of Classification Search ............... 382/119, 382/159, 181, 186–190, 305; 73/865.4; 348/161; 713/186
See application file for complete search history.

(56) References Cited

U.S. PATENT DOCUMENTS 5,644,652 A * 7/1997 Bellegarda et al. .......... 382/186

OTHER PUBLICATIONS

Russell, et al. "Dynamic Signature Verification Using Discriminative Training", IEEE, pp. 1-5, 2005.*
L. Yang, B.K. Widjaja, R. Prasad, "Application of Hidden Markov Models for Signature Verification," Pergamon, The Journal of the Pattern Recognition Society, vol. 28, No. 2, pp. 161-170 (1995).
Jaeyeon Lee, Ho-Sub Yoon, Jung Soh, Byung Tae Chun, Yun Koo Chung, "Using Geometric Extrema for Segment-to Segment Characteristics Comparison in Online Signature Verification," Pergamon, The Journal of the Pattern Recognition Society, vol. 37, pp. 93-103 (2004).

Kai Huang, Hong Yan, "Stability and Style-Variation Modeling for Online Signature Verification," Pergamon, The Journal of the Pattern Recognition Society, vol. 36, pp. 2253-2270 (2003).
Lawrence R. Rabiner, "A Tutorial on Hidden Markov Models and Selected Applications in Speech Recognition," Proceedings of the IEEE, vol. 77, No. 2, Feb. 1989.
Daigo Muramatsu, Takashi Matsumoto, "An HMM On-line Signature Verifier Incorporating Signature Trajectories," IEEE Computer Society, pp. 438-442 (2003).
K. Tanabe, M. Yoshihara, H. Kameya, S. Mori, S. Omata, T. Ito, "Automatic Signature Verification Based on the Dynamic Feature of Pressure," IEEE, pp. 1045-1049 (2001).
Luan L. Lee, Toby Berger, "Reliable On-line Human Signature Verification System for Point-of-Sales Applications," IEEE, pp. 19-23 (1994).

(Continued)

*Primary Examiner*—Daniel G Mariam
(74) *Attorney, Agent, or Firm*—Perkins Coie LLP

(57) ABSTRACT

Methods and systems for training a computer to recognize and verify an individual's signature are provided. One illustrative method extracts a plurality of both global and local features from a relatively small sample of handwriting samples. In one such embodiment, only 5 samples are needed from an individual without requiring forgeries. In yet another embodiment, only three global parameters are utilized, thus reducing the complexity, and processing power, of the system. Utilizing such few global parameters also facilitates fine tuning of the systems. Further aspects of the invention relate to a multi-stage statistical system for on-line signature verification. In one embodiment, the system may comprise a simplified GMM model built on global signature properties and a left-to-right HMM model based on segmental features. In one embodiment, specific strategies are utilized to create model simplification and initialization in contrast to general GMM and HMM models.

20 Claims, 2 Drawing Sheets

OTHER PUBLICATIONS

R.S. Kashi, J. Hu, W.L. Nelson, W. Turin, "On-line Handwritten Signature Verification Using Hidden Markov Model Features," IEEE, pp. 253-257 (1997).

Ronny Martens, Luc Claesen, "On-line Signature Verification by Dynamic Time-Warping," IEEE, pp. 38-42 (1996).

Mingfu Zou, Jianjun Tong, Changping Liu, Zhengliang Lou, "On-line Signature Verification Using Local Shape Analysis," IEEE Computer Society, 5 pages (2003).

Jeff A Bilmes, "A Gentle Tutorial of the EM Algorithm and its Application to Parameter Estimation for Gaussian Mixture and Hidden Markov Models," International Computer Science Institute, pp. 1-13 (Apr. 1998).

J.G.A. Dolfing, E.H.L. Aarts, J.J.G.M. Van Oosterhout, "On-line Signature Verification with Hidden Markov Models," Philips Research Laboratories, 8 pages (2000).

Jack Sklansky, Victor Gonzalez, "Fast Polygonal Approximation of Digitized Curves," The Journal of the Pattern Recognition Society, vol. 12, pp. 327-331 (Jan. 1980).

Gopal Gupta, Alan McCabe, "A Review of Dynamic Handwritten Signature Verification," Department of Computer Science, James Cook University, Townsville, Qld 4811, Australia, pp. 1-54 (Sep. 1997).

Mohammad M. Shafiei, Hamid R. Rabiee, "A New On-line Signature Verification Algorithm Using Variable Length Segmentation and Hidden Markov Models," IEEE Computer Society, 4 pages (2003).

\* cited by examiner

SIGNATURE VERIFICATION

BACKGROUND

Throughout human history, there has been a need to verify an individual's identity. Signature verification is perhaps one of the oldest means for identifying a particular person. Similar to other biometrical information, such as fingerprint analysis, a signature conveys distinguishable characteristics that indicate personal identity. Given its long usage throughout our culture and the relative lack of privacy concerns when compared to fingerprint and other biometric analysis, accurate and efficient fingerprint analysis remains an important field.

As more individuals must identify themselves in a computing environment, electronic verification of signatures has become increasingly important. However, automatic signature verification is a challenging task due to practical constraints. For example, it is often impractical to collect large amount of signatures of a new user for training purposes. Moreover, it is also impractical and inefficient to get forgeries or "negative samples" when using the system.

Existing methods of signature verification can be classified into two categories: off-line and on-line. Off-line methods acquire data by scanning signatures and process them as static images. On-line methods capture signature tracks in time-variable sequences, such as positions, pressure, and pen tilt. On-line methods usually achieve higher accuracy than off-line ones because they can make use of dynamic information (speed, pressure, etc.) that is missing in static images.

Many attempts have been made to perfect on-line signature verification systems. Dynamic time warping ("DTW") is one widely-used method to find the similarity between the input signature patterns and the stored templates. The signature pattern is usually represented by a sequence of feature vectors defined on every sample point of the signature. Hidden Markov Model ("HMM") is another technique for signature verification in recent years, because it has been successful in modeling time-variable sequences for speech and on-line handwriting recognition. Another method, Gaussian Mixture Model ("GMM") has also been attempted for signature distribution estimation. These models (DTW, HMM, and GMM) focus on local properties of signatures such as local moving direction and shape curvature.

Unfortunately, past attempts have been associated with several drawbacks. Using complex systems such as those required under current protocols, usually requires large training sample sets and processing capabilities. Moreover, as previously mentioned, many systems often require forgeries or negative samples from which to compare. Therefore, there exists a need in the art for electronic systems and methods for accurately and efficiently verifying signatures. Another need exists for a simple system that incorporates the advantages of two or more complex systems without the drawbacks associated with the complex systems. These and other needs are met with one or more aspects of the invention.

SUMMARY

Aspects of the invention relate to improved methods and systems for training a computer to recognize and verify an individual's signature. In one example, both global and local features, are extracted from the handwriting samples. In another aspect, no forgeries are required from the user in the training phase. Our system and method only utilize three global parameters, thus reducing the complexity and processing power of the system. Utilizing such few global parameters also facilitates fine tuning of the systems.

Further aspects of the invention relate to a multi-stage statistical system for on-line signature verification. In one example, the system may comprise a simplified GMM model built on global signature properties and a left-to-right HMM model based on segmental features. In another example, specific strategies are utilized to create model simplification and initialization in contrast to general GMM and HMM models.

These and other advantages will become apparent from the following detailed description when taken in conjunction with the drawings, A more complete understanding of the present invention and the advantages thereof may be acquired by referring to the following description in consideration of the accompanying drawings, in which like reference numbers indicate like features, and wherein:

DETAILED DESCRIPTION

Exemplary Operating Environment

Figure 1:
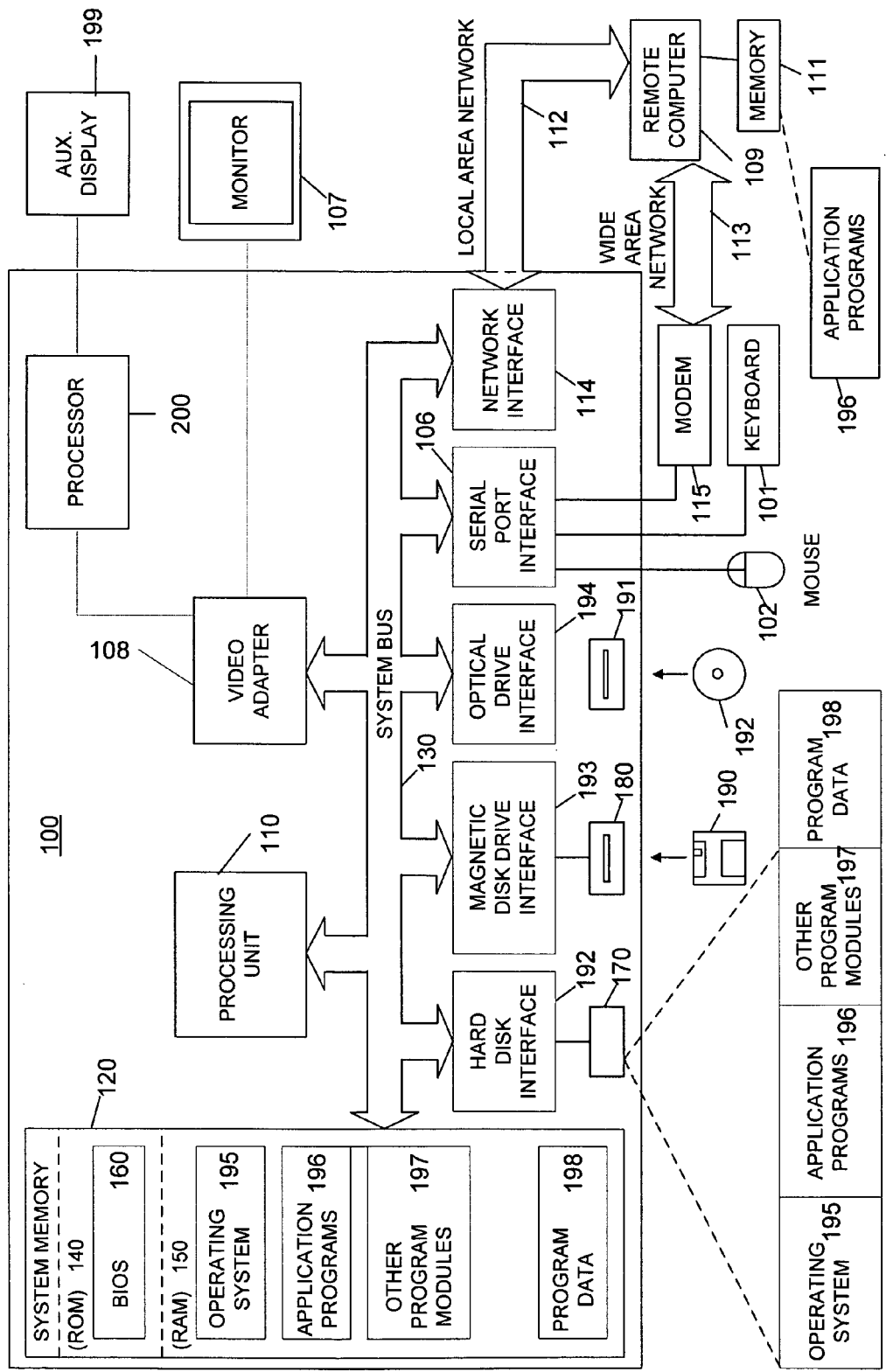
FIG. 1 illustrates an exemplary computer system in which embodiments of the invention may be implemented.

FIG. 1 is a functional block diagram of an example of a conventional general-purpose digital computing environment that can be used in connection with the methods and systems of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. An auxiliary display device 199 may also be in communication with computer 100. The auxiliary device may be integrated within the computer (as shown), detachable, or external. The auxiliary display device 199 may optionally be in communication with an auxiliary processor 200, which may be integrated within the auxiliary display or housed within the computer 100. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
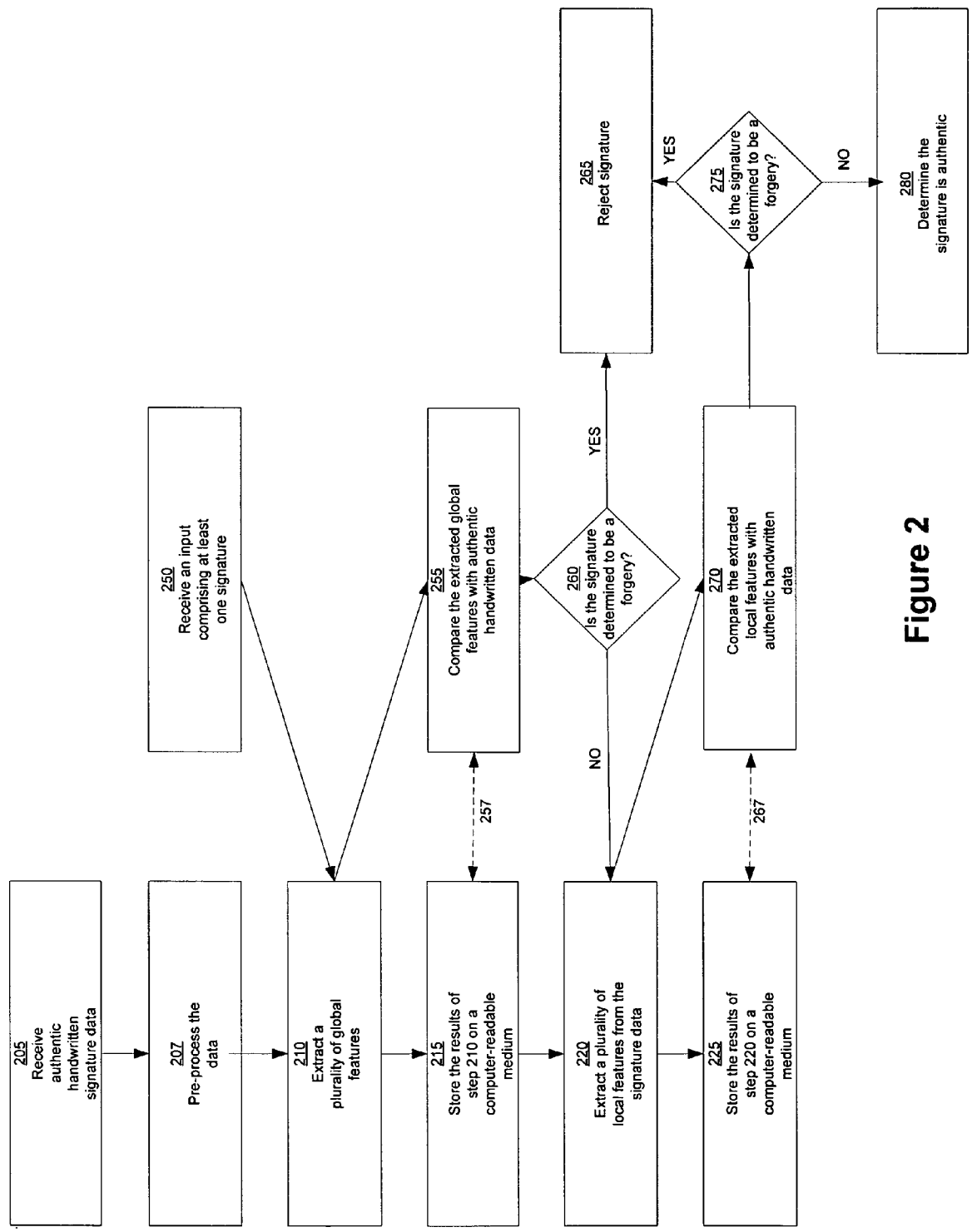
FIG. 2 illustrates a functional block diagram of one exemplary method for training and utilizing a computer to recognize a user's handwriting.

FIG. 2 illustrates a functional block diagram of one method of training and utilizing a computer to recognize a computer user's handwriting. In one embodiment, the computer may be arranged similar to computer 100. In step 205, the computer, such as computer 100, receives handwriting samples of at least one character written by the user. The handwriting samples may be received through any user input device, such as for example, a writing utensil, a heat sensitive surface, a pressure sensitive surface and combinations thereof. In yet another embodiment, the user may "select" a signature or representation thereof previously stored on a computer-readable medium, such as hard disk drive 170, to serve as one or more samples. In yet another embodiment, the user may "draw" the signature by moving a mouse, trackball, or other user input device over a surface.

While the term "signature" often refers to an individual's name or derivative thereof, embodiments of the invention may utilize a "signature" that is merely a distinctive mark or collection of characters an individual may utilize for identification. As used herein, the term "character" may refer to any letter, number, graphical icon, or alphanumeric representation in any language. Indeed, any shape or design that may be received at a computing device through a user interface and be verified is a character within the scope of the invention. In one embodiment, a "signature" may be a character or collection of characters that the individual supplies the computer, such as a password.

By "authentic", it is meant that the user input received by the user comprises a signature as the individual intended to accurately portray. One skilled in the art will realize that some variation may exist among a plurality of authentic samples provided from an individual, however, authentic samples exclude the presence of forgeries. While forgeries may be utilized to fine tune the system in select embodiments, forgeries are not utilized in training the system within the scope of step 205 and related or similar steps within the scope of the invention.

Optional step 207 may be utilized to pre-process the signature data. As known to those skilled in the art, there are a plurality of techniques that may be used to pre-process the signature data. One such process may be the utilization of a Gaussian filter to smooth the positioning, such as the "x" and "y" coordinates of the signature, and the pressure data "p". Such techniques may greatly reduce or eliminate unexpected noise from the signature data obtained in step 205. In one embodiment, special attention is directed towards the orientation of the signature. In providing the signature in step 205, the user may sign his/her signature in an arbitrary orientation. Therefore, step 207 may be used to detect writing direction. In one such embodiment, an average estimation from two methods, a principal component analysis and linear regression may be used. The signature may then be rotated to a horizontal orientation.

In step 210, the distribution of a plurality of global features within the signature data is extracted to build a distribution model for the plurality of global features. In one embodiment, the distribution of global features is represented by a two-component Gaussian Mixture Model. In one such embodiment, the global features may include one or more spatial features and one or more dynamic features. Exemplary spatial features include, but are not limited to: width and height of the signatures, total length of signature strokes, stroke count and number of self-intersection points, segment count and total curvature, and combinations thereof. Exemplary dynamic features that may be used in one ore more embodiments of the invention include, but are not limited to: the average speed and the maximum speed, the average pressure and the maximum pressure difference between two sample points, total duration time, ratio of pen-down time to total writing time, and combinations thereof.

To further reduce the quantity of global features that need to be extracted, spatial and dynamic features that exhibit low correlation may be chosen. The GMM model is a weighted combination of multiple Gaussians. A distinct property of GMM model is its power to approximate any probability density. Denote an M-component GMM model by the notation $\Theta=\{(\alpha_l,\mu_l,\Sigma_l):l=1,\ldots,M\}$, exhibited by the general form shown as Equation 1.

$$p(x|\Theta) = \sum_{l=1}^{M} \alpha_l \cdot p(x|\mu_l,\Sigma_l) \quad \text{Equation (1)}$$

Equation 1 has the general form where x is an n-dimensional feature vector, $\alpha_l$ is the coefficient with $\alpha_l=P(l|\Theta)$, $\Sigma\alpha_l=1$, and $\mu_l$ and $\Sigma_l$ are the mean vector and the covariance matrix of the l-th Gaussian component, respectively. Each component's distribution is an n-variable Gaussian function.

The GMM complexity is controlled by component count M and covariance matrix, wherein a larger M and full covariance matrix $\Sigma$ defines a complex GMM model. While previous systems having one complex GMM may approximate a sample distribution at least as accurately, the complex model also has many unknown parameters to estimate. This would require large quantities of training samples. As discussed above, this greatly diminishes any ability for the system to be user-friendly and efficient.

A simpler model requiring fewer samples is utilized in many embodiments of the invention. In one embodiment, simplification may be achieved by representing the distribution variance by a diagonal matrix. While the diagonal covariance matrix may lose some information when compared to a full covariance matrix, when the parameter vectors are not considerably correlated, the lost information can be neglected. As mentioned previously, the global features utilized in embodiments of the invention exhibit low correlation to each other, thus allowing for a diagonal matrix. Moreover, utilizing a diagonal matrix results in a significant reduction in the computational load.

According to another embodiment of the invention, fewer Gaussian components may be chosen to simplify the process. Embodiments of the invention utilize very small quantities of samples to be collected. For example, an embodiment using 5 authentic samples as the training set is significantly distinct from a complex GMM model. In one such embodiment, a 2-component GMM is implemented.

Moreover, in order to avoid GMM learning from being stuck in local extrema, K-means clustering may be applied for "good" initialization. Because a simplified GMM model may contain as little as 2 components, simple methods may be implemented to initialize the GMM. For example, embodiments utilizing 5 samples being separated into 2 classes, there are a total of 10 combinations. Therefore, choosing the best combination with small intra-class distance and large inter-class distance is possible. Note that the parameter vector does not have the same unit in each dimension. We may normalize them before computing the distances.

An EM algorithm, for example the algorithm to find the parameter vector $\Theta$ that maximizes an objection function shown as Equation 2 may then be applied for GMM model learning. Given an incomplete data set $X=\{x_l,\ldots,x_K\}$, where K is the number of samples, and $\Theta$ is the parameter vector, the GMM log-likelihood is computed as, $$\log(p(X|\Theta)) = \sum_k \log(p(x_k|\Theta)) \quad \text{Equation (2)}$$

The EM algorithm updates the initial model and guarantees that the log-likelihood of the new model increases. The new model may then be used for the next iteration. This iterative process continues until the log-likelihood of the new model converges.

As shown in FIG. 2, the values obtained from step 210 may then be stored on a computer-readable medium, such as hard disk drive 170. The computer-readable medium may be remote, such as operatively connected through WAN 113. Such embodiments may be implemented where the individual must train a system that controls access to web media or remote servers, for example, servers housing financial data.

In step 220, a plurality of local features are extracted from the handwritten signature data. In one embodiment, the signature data may be divided into a plurality of segments. For example, a plurality of points may be extracted from the characters which comprise the signature. The characters may be divided at locations that exhibit high curvature using Sklansky's algorithm, for example, as described in Sklansky J. and Gonzalez V., Fast Polygonal Approximation of Digitized Curves. Pattern Recognition, Vol. 12, pp. 327-331, 1980, incorporated herein by reference in its entirety. Exemplary local features extracted from the segments of the signature data includes one or more features selected from the group consisting of: the count of sample points, the segment length and direction, the average pressure and maximum pressure difference, the time duration, and the relative position/direction with respect to other segments.

Those local features which are extracted may be incorporated with DTW or HMM techniques for signature verification. Previous DTW-based systems may resample the signature into an equal-distant point sequence before string matching, however, the resampling process may result in loss of important local details. Therefore, systems and methods of the invention use non-resampled signature data.

Denote the segmental features extracted from the k-th signature as $Y^k$ (see Equation 3a).

$$Y^k=(y_1^k,y_2^k,\ldots,y_{T^k}^k),$$

and $$y_t^k=(f_{t1}^k,f_{t2}^k,\ldots,f_{tD}^k), \quad \text{Equation 3}$$

where $T^k$ is the number of segments, $f^k_{td}$ is the d-th feature for the t-th segment's feature vector $y^k_t$, and D is the dimension of segmental feature vector. After local features, i.e. $\{Y^k, k=1,\ldots, K\}$, from all training samples are obtained, a discrete left-to-right HMM model may be trained.

A discrete HMM $\lambda$ has five elements: the state number N, the number M of distinct observation symbols per state, the states transition probability distribution $A=\{a_{ij}\}$, the observation symbol probability distribution $B=bi(k)$ in state i, and the initial state distribution $\Pi=\{\Pi_i\}$ Several factors have impact on the complexity of HMM models, such as the underlying model structure, distribution form (continuous or discrete), and the number N or M. Given a discrete HMM, the underlying model structure determines the number of unknown parameters. The more complex the structure is, the more parameters there are, and the more training samples are required. Considering the small size of the training set in select embodiments, we may build a first-order left-to-right no-skip DHMM model with N=6 and M=16.

Before HMM learning, feature sequence $Y^k$ may be converted to an HMM's observation sequence $O^k$. Such conversion can be realized by a vector quantizer. We adopt a modified K-means clustering algorithm to group segmental feature vectors into M (the number of HMM observation symbols)

clusters, and take the cluster centers as the codebook. Accordingly the sequence $Y^k$ can be encoded into a series of code index or symbol:

$$O^k=(o_1^k,\ldots,o_{Tk}^k) \quad \text{Equation 4}$$

Similar to the GMM, the HMM model may reach rapid and proper convergence in iterative learning process if starting from a good initial estimate of the parameters. For our DHMM model, $A=\{a_{ij}\}$ can be selected randomly, but $\pi=\{\pi_i\}$ must be fixed as $\pi_1=1$, $\pi_i=0$, $i\neq 1$. As for $B=\{b_i(k)\}$, a segmental K-means training procedure to optimally search the initial values may be implemented. The EM algorithm may then be applied to train the HMM model. The results obtained from extraction and processing the local features in conjunction with step 220 may be stored on a computer-readable medium, as discussed above (see step 225).

Further aspects of the invention relate to computer-implemented methods for verifying signature through a two stage process. In step 250, a computer, which may be the same computer utilized in step 205, receives at least one handwritten "signature". Also, like those received in step 205, the handwriting sample(s) may be received through any user input device, such as for example, a writing utensil, a heat sensitive surface, a pressure sensitive surface and combinations thereof. In yet another embodiment, the user may "select" a signature or representation thereof previously stored on a computer-readable medium, such as hard disk drive 170, to serve as one or more samples. In yet another embodiment, the user may "draw" the signature by moving a mouse, trackball, or other user input device over a surface. A pre-processing step, such as step 207 may also be used to remove noise from the sample.

Step 250 may be implemented, for example, when a computer user attempts to access a file, webpage, server, or the like with restricted access. In yet other embodiments, the user may be an individual in the financial sector attempting to access their funds, or purchase merchandise with a credit or debit card. In one embodiment, the step may require the user enter more than one signature to ensure additional security. Upon receiving the user input, a two-component Gaussian Mixture Model may be used to determine the distribution of a plurality of global features within the signature (such as step 210). However, one skilled in the art will realize that a larger quantity of global features may have been extracted during the training portion (step 210) and that in select embodiments having fewer features for verification, only a subset of those local features are extracted and utilized during the verification phase.

In step 255, the extracted global features are compared with global features extracted from other authentic signatures by the same user. As shown with bi-directional arrow 257, the global features extracted from the signature of step 250 may be compared with the one or more global features extracted at step 210. In one embodiment, the global features comprise at least one spatial features and at least on dynamic features. Indeed, spatial features may readily detect random forgery, such as signatures from other signers that are not the user. However, spatial features alone may fail to detect a forgery from a skilled forger, such as a user that purposefully and skillfully imitates a shape of the signer's authentic signatures. Dynamic features, on the other hand, have good discriminative power beyond shape features, because they are hard to be imitated by observing the signature shape after the signature has been made. Therefore, select embodiments will include both spatial and dynamic features.

As seen with step 260, it is determined if the signature submitted in step 250 is authentic based upon the global comparisons. In one embodiment, a signature's likelihood as being determined as authentic under the GMM model is represented as $p(x|\Theta)$, where it will be considered authentic for the step if:

$$p(x|\Theta)>c_g\min(p(x_k|\Theta)) \quad \text{Equation 5}$$

where $x_k$ is one training signature and $c_g$ is a global coefficient. If the signature is determined to no not be authentic, step 265 may be implemented in which the signature is rejected. In one embodiment, step 250 may be reinitiated and allow the user to enter another input comprising a signature. In yet another embodiment, the user will be locked out of the service or not allowed to make a purchase if the step 260 is initiated. If the signature, however, is determined to be authentic based upon the GMM, a plurality of local features are extracted from the signature submitted in step 250, such as performed in step 220.

In step 270, the extracted local features are compared with local features extracted from other authentic signatures by the same user. As shown with bi-directional arrow 267, the local features extracted from the signature of step 250 may be compared with the one or more local features extracted at step 220.

In one embodiment, the observation sequence corresponding to the test signature is denoted x by O, and the joint log-likelihood of sequence O against the HMM by $P(O|\lambda)$. The test sample passes HMM test when it satisfies:

$$P(O|\lambda)>c_h\min(p(O_k|\lambda)), \quad \text{Equation 6}$$

where $c_h$ is another global coefficient and $O_k$ is the observation sequence of the k-th sample signature. As one skilled in the art will realize, other methods may be used individually or in combination with the above methodology to determine if the signature is a forgery, such steps may be implemented, for example, in step 275. In one embodiment, if the signature is determined to not be authentic based upon the global features, a step may be implemented to reject the signature, such as step 265. If, however, the signature is not rejected, step 270 may be implemented to determine the signature is authentic. In yet another embodiment, a signature submitted in step 250 that is later determined to be authentic (such as in step 270) may undergo the training process starting with step 205 to further increase the accuracy of the system.

The present invention has been described in terms of exemplary embodiments. Numerous other embodiments, modifications and variations within the scope and spirit of the appended claims will occur to persons of ordinary skill in the art from a review of this disclosure. For example, one skilled in the art will realize that additional or less steps may be implemented to train and/or verify signatures within the scope of the present invention. In yet another embodiment, both the global and local features may be extracted before any comparison of the features is performed.

Moreover, while the exemplary embodiments illustrate the use of user tiles in a PC environment, the invention, however, may be configured for personal gaming systems, such as Sony® Playstation® or Microsoft® Xbox®, handheld systems such as a Palm® or Treo®, among others, for example, cellular-based applications. In still yet further embodiments, the invention is configured for web-based applications that may be incorporated within or independent of cellular-based applications.

We claim:

1. A computer-implemented method for verifying signatures through a two stage process comprising the steps of:
   using a computer to perform the steps of:

(a) receiving a series of authentic user inputs, each comprising handwritten signature data;

(b) extracting with a two-component Gaussian Mixture Model the distribution of a plurality of global features within the handwritten signature data to obtain a value for the plurality of global features, wherein the global features comprise at least one spatial feature and at least one dynamic feature, wherein the at least one spatial feature and at least one dynamic feature exhibit low correlation;

(c) storing the values obtained in step (b) on a computer-readable medium;

(d) extracting a plurality of local features from the signature data to obtain a value for each local feature; and (e) storing the values obtained in step (d) on a computer-readable medium.

2. The computer-implemented method of claim 1, wherein the at least one global spatial feature is selected from the group consisting of: width and height of the signatures, total length of signature strokes, stroke count and number of self-intersection points, segment count and total curvature, and combinations thereof.

3. The computer-implemented method of claim 1, wherein the at least one global dynamic feature is selected from the group consisting of: the average speed and the maximum speed, the average pressure and the maximum pressure difference between two sample points, total duration time, ratio of pen-down time to total writing time, and combinations thereof.

4. The computer-implemented method of claim 1, further comprising the step of:

(f) prior to step (b), preprocessing the user inputs of step (a), wherein preprocessing includes at least one of the processes selected from the group consisting of: adjusting the horizontal alignment of the handwriting data, adjusting the pressure data of the handwriting data, and combinations thereof.

5. The computer-implemented method of claim 1, wherein step (d) comprises the step of dividing the signature data into a plurality of segments.

6. The computer-implemented method of claim 5, wherein the local features extracted from the segments of the signature data includes one or more features selected from the group consisting of: the count of sample points, the segment length and direction, the average pressure and maximum pressure difference, the time duration, and the relative position/direction with respect to other segments.

7. The computer-implemented method of claim 1, wherein the series of authentic user inputs consists of five user inputs.

8. The computer-implemented method of claim 1, wherein the plurality of global features depend on three global parameters.

9. The computer-implemented method of claim 1, further comprising the steps of:

(f) receiving a least one user input comprising handwritten signature data (g) estimating with a two-component Gaussian Mixture Model the distribution of a plurality of global features within the signature data;

(h) comparing the distribution of the plurality of global features with a plurality of authentic user inputs comprising handwriting signature data to determine the authenticity of the handwritten signature data;

(i) upon determining the handwritten signature data is authentic, extracting a plurality of local features from the signature data to obtain a value for each local feature; and (j) comparing the extracted values of step (d) with a plurality of previously stored values for the same local features to determine the authenticity of the handwriting signature data.

10. A computer-implemented method for verifying signature through a two stage process comprising the steps of:

using a computer to perform the steps of:

(a) receiving a least one user input comprising handwritten signature data;

(b) estimating with a two-component Gaussian Mixture Model the distribution of a plurality of global features within the signature data;

(c) comparing the distribution of the plurality of global features with a plurality of authentic user inputs comprising handwriting signature data to determine the authenticity of the handwritten signature data;

(d) upon determining the handwritten signature data is authentic, extracting a plurality of local features from the signature data to obtain a value for each local feature; and (e) comparing the extracted values of step (d) with a plurality of previously stored values for the same local features to determine the authenticity of the handwriting signature data.

11. The computer-implemented method of claim 10, wherein step (b) utilizes three global parameters.

12. The computer-implemented method of claim 10, wherein the at least one global spatial feature is selected from the group consisting of: width and height of the signatures, total length of signature strokes, stroke count and number of self-intersection points, segment count and total curvature, and combinations thereof.

13. The computer-implemented method of claim 10, wherein the at least one global dynamic feature is selected from the group consisting of: the average speed and the maximum speed, the average pressure and the maximum pressure difference between two sample points, total duration time, ratio of pen-down time to total writing time, and combinations thereof.

14. The computer-implemented method of claim 10, further comprising the step of:

(f) prior to step (b), preprocessing the user inputs of step (a), wherein preprocessing includes at least one of the processes selected from the group consisting of: adjusting the horizontal alignment of the handwriting data, adjusting the pressure data of the handwriting data, and combinations thereof.

15. The computer-implemented method of claim 10, wherein step (d) comprises the step of dividing the signature data into a plurality of segments.

16. The computer-implemented method of claim 15, wherein the local features extracted from the segments of the signature data includes one or more features selected from the group consisting of: the count of sample points, the segment length and direction, the average pressure and maximum pressure difference, the time duration, and the relative position/direction with respect to other segments.

17. In a computer system having a graphical user interface including a display and a user interface input device, a method of configuring a computer to recognize a user's handwriting comprising the steps of:

using a computer to perform the steps of:

(a) displaying on the display device at least one input field for receiving a user input in the form of handwritten signature data;

(b) receiving a input signal indicative of the user interface input device providing about 4 to about 6 inputs of authentic signature data;

(c) extracting with a two-component Gaussian Mixture Model the distribution of a plurality of global features within the authentic handwritten signature data to obtain a value for the plurality of global features, wherein the global features comprise at least one spatial feature and at least one dynamic feature, wherein the at least one spatial feature and at least one dynamic feature exhibit low correlation;

(d) extracting a plurality of local features from the authentic signature data to obtain a value for each local feature extracted;

(e) receiving a least one user input comprising unverified handwritten signature data;

(f) estimating with a two-component Gaussian Mixture Model the distribution of global features within the unverified signature data to obtain a value;

(g) comparing the distribution of the global features extracted in step (f) with at least a portion of the values for the global features extracted from the plurality of authentic user inputs extracted in step (c) to determine if the signature should continue the verification process;

(h) for those signatures determined to continue the verification process, extracting a plurality of local features from the unverified signature data to obtain a value for each local feature; and (i) comparing the extracted values of step (d) with at least a portion of the local features extracted from the plurality of authentic handwriting signature data in step (d).

18. The computer-implemented method of claim 17, wherein the about 4 to about 6 inputs of authentic signature data of step (b) comprises 5 user inputs.

19. The computer-implemented method of claim 17, wherein the at least one global spatial features extracted in step (c) is selected from the group consisting of: width and height of the signatures, total length of signature strokes, stroke count and number of self-intersection points, segment count and total curvature, and combinations thereof and the at least one global dynamic features extracted in step (c) is selected from the group consisting of: the average speed and the maximum speed, the average pressure and the maximum pressure difference between two sample points, total duration time, ratio of pen-down time to total writing time, and combinations thereof.

20. The computer-implemented method of claim 17, further comprising the step of:

(j) prior to step (c), preprocessing the user inputs of step (b), wherein preprocessing includes at least one of the processes selected from the group consisting of: adjusting the horizontal alignment of the handwriting data, adjusting the pressure data of the handwriting data, and combinations thereof.

* * * * *